Oct. 21, 1958     H. C. MacDOUGALL     2,856,976
COCONUT FLAKING DEVICE
Filed Feb. 23, 1955     2 Sheets-Sheet 1

INVENTOR
Hugh C. MacDougall.
BY Frederick F. Mack
and Sidney M. Hones
ATTORNEYS

United States Patent Office 2,856,976
Patented Oct. 21, 1958

2,856,976

COCONUT FLAKING DEVICE

Hugh C. MacDougall, Palisade Park, N. J., assignor to General Foods Corporation, White Plains, N. Y., a corporation of Delaware Application February 23, 1955, Serial No. 489,847

2 Claims. (Cl. 146—7)

This invention relates to coconut, and particularly to a device for producing a new form of prepared or packaged coconut product useful for bakery, confectionery, and household purposes.

Heretofore coconut shreds have been prepared by shredding the native coconut meat and drying or desiccating it to a low moisture in the neighborhood of 2–5% in the country of origin. The shredded coconut is usually marketed domestically after rehydration to about 25% moisture and treatment with sugar and salt as well as preservatives like glycerin and propylene glycol. Thereafter, the coconut product is usually re-dried to about 7–18% moisture, packaged, and marketed. The final coconut product should preferably be soft and pliable and feel moist to the touch. It is not uncommon, however, for the coconut shreds which are in the order of 1/16 of an inch in cross section to suffer from loss of palatability and tenderness. Such losses usually are evident after the coconut has been exposed to atmospheric conditions for a relatively short period of time or after prolonged storage using ordinary packages other than hermetically sealed containers. In attempting to maintain palatability and tenderness by providing a moist rehydrated coconut product for long periods, it frequently happens that micro-organisms develop and cause undesirable deterioration in the coconut. Humectants and mold inhibitors have been employed, therefore, in such products to enhance shred quality by improving the ability of sweetened, hydrated coconut products to retain moisture over substantial periods without mold growth and thereby assure tender, fresh, palatable coconut products. While some success has been achieved in this direction, present day commercial coconut products leave much to be desired in affording the consumer maximum tenderness and palatability.

This deficiency is in part attributable to the present form of coconut shred. The cells in the coconut shred are substantially compressed from their original state in the process of subdividing the coconut meat. As a result, the shred has a minimum of treatable internal cellular and external surface areas for a given weight of coconut. To explain, a commonly used device for shredding large quantities of coconut meat comprises a rotating disc having tangentially arranged thereon a series of perpendicular comb teeth and a radial cutting knife perpendicular to the comb teeth just above the plane of the disc. As the disc rotates, chunks of fresh coconut meat are pressed against it and are squeezed between the comb teeth and the cutting knife to form the coconut shred. This causes a large degree of compression (in the order of 40%) of the coconut meat. The compressed coconut shreds are then dried into a hard brittle product for shipment to domestic markets. As a result, in subsequent rehydration processes where the dried shreds are treated with sweeteners as well as humectants and mold inhibitors to provide the desired commercial product, the function of these agents is not fully availed of by reason of the compressed and substantially closed cellular arrangement in the coconut shred.

It is an object of the present invention to provide a device for producing a coconut product of substantially increased tenderness and palatability.

Another object of the invention is to provide a device for producing a coconut product having improved tenderness and palatability in its rehydrated form.

It has now been found that a rehydrated coconut product of improved tenderness and palatability is produced by shredding the coconut in such a way as to provide a maximum of surface area without substantial compression of the coconut meat. This is accomplished by subdividing the coconut into relatively thin flakes. These flakes are produced by tearing the coconut from the meat by means of a number of biting edges. The biting edges are spaced with respect to one another so as to produce the thin flakes in the form of elongated ribbons as the biting edges are advanced with respect to the meat. As a result, the transverse edge portions of the flake are uneven and serrated. The coconut flake is characterized by a minimum of compression of the shred and an open, random arrangement of its cells. This enables a rehydrated coconut product substantially saturated with sweeteners and having maximum penetration of humectants and mold inhibitors.

The device for producing the improved coconut "flake" of the present invention can best be illustrated by reference to the accompanying figures and pictorial views wherein—

Figure 7:
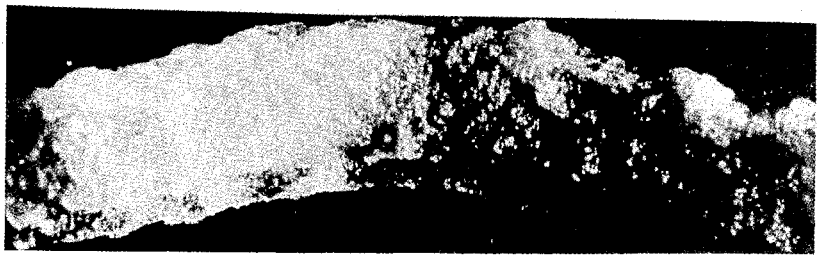
Figure 8:

Fig. 7 is a photomicrograph (magnification 15×) of the rehydrated coconut flake produced by the device of the present invention; and Fig. 8 is a photomicrograph (magnification 15×) of a histological section substantially 20 microns in thickness of the coconut flake in Fig. 7.

Referring to Figs. 1 through 4, the coconut flake of the present invention is preferably produced by placing freshly husked coconut meat into a hollow cylinder 10 and introducing the meat onto a circular disc 12 rotatable within the cylinder. The coconut meat is fed positively by means of a slight pressure applied to cylindrical plunger 14 which fits complementarily within the cylinder and is slidable axially therein.

The disc 12 comprises a circular flat plate 16 suitably attached as by rivets 18 to a circular base member 20. A number of blocks 22 each having a row of spaced, aligned teeth 24 are fixedly mounted by means of studs 26 to the underside of base member 20 and fit matingly in complementary recesses provided in the base member. Each row of teeth 24 projects upwardly through complementary radially extending slots 28 in the base member 20 and the free ends of each row of teeth 24 clear the upper face of plate 16 through radially extending rows of space slots 30.

The disc assembly 12 is rotated within the cylinder 10 by means of a shaft 32 having the base member 20 mounted fast thereon. Each of the teeth 24 extends through the plate 16 and the base member 20 in the general direction of rotation of the disc assembly. Each tooth has a forward underface 34 substantially offset at the free end of the tooth from both the slots 28 and 30 in the base member and plate respectively such that a biting edge 36 for each tooth has a gap between it and the plate permitting flakes torn from the chunks of coconut meat to pass downwardly through the disc assembly to a collecting bin. The straight biting edges 36 of the teeth extend in parallel relation with the upper surface of the plate and preferably clear said upper surface by about .015 to .025 inch depending upon the desired thickness of the flake, it being preferred to produce as thin and continuous a flake as possible to provide a maximum of surface area.

As the disc assembly 12 is rotated and the coconut meat is maintained on the surface of the rotating plate 16, the forward underfaces 34 of adjacent teeth in combination with portions 38 of the plate intermediate adjacent teeth shear the coconut severed by the biting edges 36 from the meat with a distinct tearing action characterized by a minimum of compression during formation of the flake. The uncut coconut meat passing between adjacent teeth is similarly formed into thin flakes by successive rows of teeth 24 which are staggered such that portions of coconut meat passing between one row of teeth will be cut by a succeeding row.

While six rows of radially aligned, spaced teeth are shown in the drawings, any number of such rows may be provided. Also, although a rotating disc having a plurality of rows of biting edges rotating about a central axis for the purpose of producing the distinctive flake of the present invention is shown, any equivalent oscillating, reciprocating and like means for advancing the spaced biting edges of the teeth may be employed. The desired common feature of all such devices is that they have a series of substantially aligned biting edges clearing a supporting surface for the coconut meat in such a manner as to cut thin sections of the meat and shear these cut sections without substantial compression of the coconut cells. The flake thus produced is characterized by a substantially open and randomly arranged cellular structure. The flake is further characterized by uneven and serrated "feathered" edges produced by the tearing action at the transverse edges of the flake as it is formed.

Figure 1:
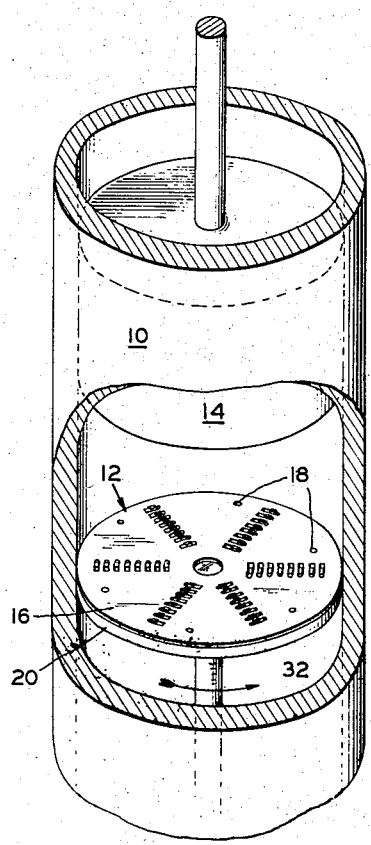
Fig. 1 is a perspective view with a portion of the cylinder wall broken away of a preferred embodiment of a device for producing the flake of the present invention.
Figure 2:
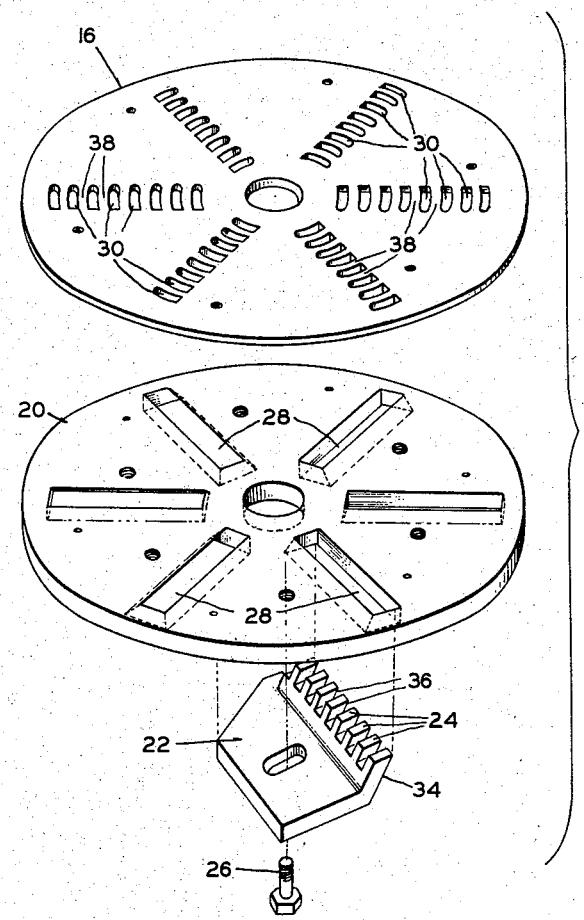
Fig. 2 is an enlarged exploded perspective view of parts of the device in Fig. 1.
Figure 3:
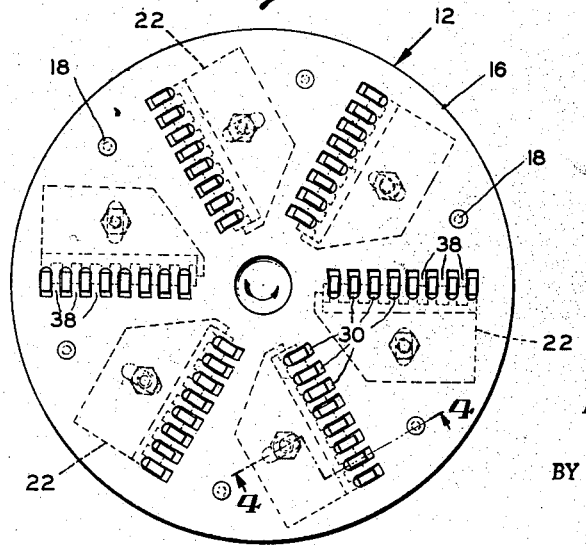
Fig. 3 is a plan view of the parts in Fig. 2 as assembled.
Figure 4:
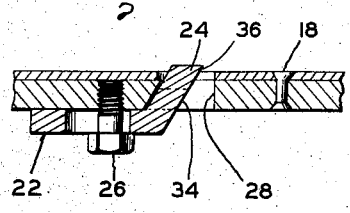
Fig. 4 is an enlarged sectional view along line 4—4 in Fig. 3.
Figure 5:
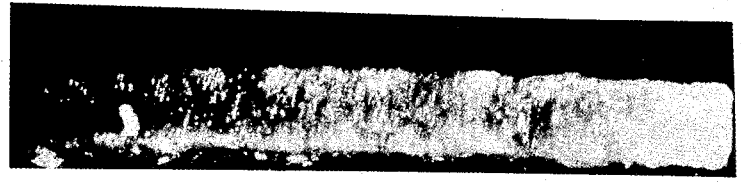
Fig. 5 is a photomicrograph (magnification 15×) of a conventional rehydrated coconut shred.
Figure 6:
Fig. 6 is a photomicrograph (magnification 15×) of a histological section substantially 20 microns in thickness of the coconut shred in Fig. 5.

As can be seen by comparing the histological section in Fig. 8 of the rehydrated coconut flake in Fig. 7 with that of a similar section (Fig. 6) of the more conventional coconut shred (Fig. 5), the open cellular texture of the coconut flake in Figs. 7 and 8 is more susceptible to the ingress of sweetening agents such as sugar and salt. Moreover, the large ratio of surface area of the flake to cross sectional area provides a maximum of tasting surface thereby providing a more pleasurable sensation when the coconut flake of the present invention is consumed. Advantageously also, the sweetened coconut flake has a distinct elastic, springy, moist feel when rehydrated such that it is desirably soft and pliable. The rehydrated flake is notably advantageous in that it covers a relatively large confectionery or baked product surface area for a given quantity of coconut.

Similarly the effect of humectants like glycerin and propylene glycol is much more pronounced in the present coconut flake. This is again evidenced by the open and in parts broken cellular structure of the rehydrated coconut flake in Figs. 7 and 8 when compared with that of the usual compressed and cleanly cut cellular arrangement shown in Fig. 6. As a result, the effects of humectants and mold inhibitors such as propylene glycol and butylene glycol, and other agents such as glycerin and sorbitol which have the function of humectants, and other agents such as lactic acid which have the function of preventing microbiological spoilage are more pronounced by reason of the higher degree of infusion into the cellular interstices in the coconut enabling lower concentrations thereof and reducing possible off-flavors stemming from increased levels.

The rehydrated coconut flake can be produced in a low or high moisture form in accordance with the desired use. A typical rehydrated high moisture coconut flake includes 60% coconut (dry basis), 25% sugar and 15% water. This flake is pasteurized and packaged in hermetically sealed containers. To this coconut product 5–10% propylene glycol may be added as a mold inhibitor and humectant.

A low moisture form of rehydrated product includes 61% coconut flake (dry basis), 27% sugar, 2–5% propylene glycol, 2% glycerin, .5% salt and 7% water. This low moisture product is suitable for packaging in cellophane wrappers and has superior freedom from spoilage.

It will be understood that while the invention has been described in part by means of a specific apparatus reference should be had to the appended claims for a definition of the scope of the invention.

What is claimed is:

1. A device for producing a coconut product of improved tenderness and palatability which comprises a base member having at least one slot therein for receiving a plurality of teeth; at least one row of spaced teeth mounted in the slot on said base member; a plate mounted on said base member extending into the area between adjacent teeth and having at least one row of spaced slots for each row of teeth complementary to the free ends of said teeth; the faces of said teeth being spaced from the slots in said base member and said plate and said teeth having substantially straight biting edges clearing and in substantially parallel relation with the upper surface of said plate; and means for advancing said base member, said plate and said teeth with respect to the coconut meat; whereby said product is torn from the coconut meat and passes through said slot in the form of a thin substantially uncompressed flake having an open irregular arrangement of cells and uneven serrated transverse edge portions.

2. A device for producing a coconut product of improved tenderness and palatability which comprises a base member having a number of slots therein for receiving a plurality of teeth; a number of rows of radially arranged spaced teeth mounted in the slots of said base member; a plate mounted on said base member extending into the area between adjacent teeth and having a number of rows of radially arranged spaced slots complementary to the free ends of said teeth; the faces of said teeth being spaced from the ends of the slots in said base member and said plate and said teeth having substantially straight biting edges clearing and in substantially parallel relation with the upper surface of said plate; the teeth in each radial row being staggered relative to the teeth in an adjacent row; and means for rotating said base member, said plate and said teeth with respect to the coconut meat; whereby said product is torn from the coconut meat and passes through said slot in the form of a thin substantially uncompressed flake having an open irregular arrangement of cells and uneven serrated transverse edge portions.

References Cited in the file of this patent

UNITED STATES PATENTS

| | | |
|---|---|---|
| 625,215 | Tice | May 16, 1899 |
| 892,808 | Carr | July 7, 1908 |
| 1,373,882 | Glassco | Apr. 5, 1921 |
| 2,256,223 | Stovel | Sept. 16, 1941 |
| 2,280,053 | Barnes | Apr. 21, 1942 |
| 2,504,900 | Stollsteimer | Apr. 18, 1950 |

FOREIGN PATENTS

| | | |
|---|---|---|
| 197,263 | Germany | Apr. 9, 1908 |